Feb. 19, 1946.  F. L. WHITE  2,395,383
TRACTION AND LOAD SUPPORTING WHEEL
Filed April 5, 1944
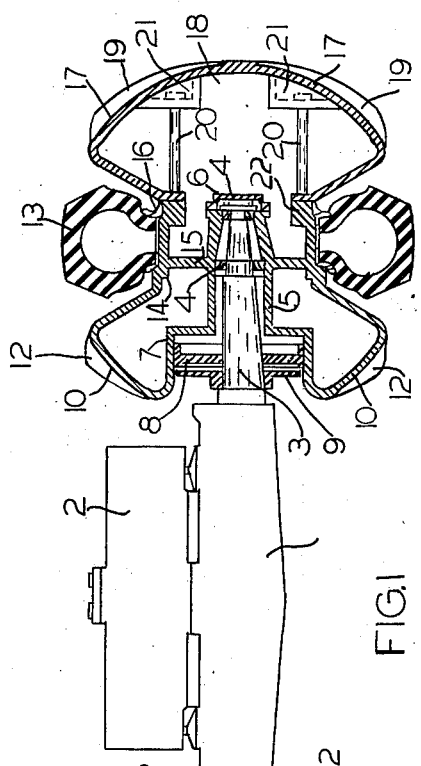
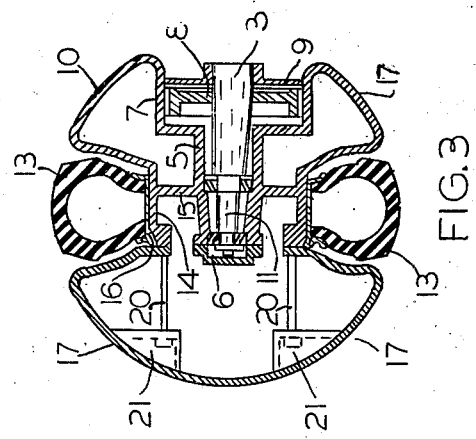
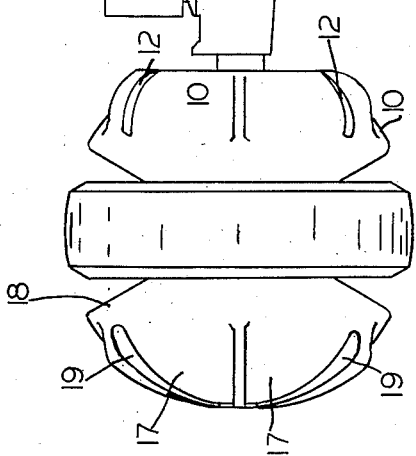
Inventor
FRED L. WHITE
By Alfred F. Dees
Attorney Patented Feb. 19, 1946

2,395,383

UNITED STATES PATENT OFFICE 2,395,383

TRACTION AND LOAD SUPPORTING WHEEL

Fred L. White, Marion, Ohio

Application April 5, 1944, Serial No. 529,891

12 Claims. (Cl. 301—41)

This invention relates to traction devices and in its more specific aspects relates to a substantially spherical wheel to increase traction and to prevent the vehicle from sinking too deeply in soft earth.

The object of this invention is to increase the tractive effect of the driving wheels on a self-propelled vehicle operating in soft earth.

Another object of the invention is to provide the driven and other wheels on a self-propelled vehicle with a substantially spherical surface.

A further object of the invention is to provide a wheel structure that will prevent the vehicle on which it is mounted from miring itself when it encounters soft earth.

Another and further object of the invention is to provide vehicle wheels on a self-propelled vehicle that will prevent them from settling in soft earth.

A still further object of the invention is to provide a wheel for self-propelled vehicle having a pneumatic tire to support the load on hard surface roadways and that has a spherical portion to prevent the tire and its wheel from settling in soft earth when traveling over the same.

Another and still further object of the invention is to provide a wheel structure having a spherical body and a pneumatic tire, the latter to support the load on hard surface roadways and the spherical portion to assist the tire in supporting the load when traversing soft earth etc.

A still further object of the invention is to provide a load supporting wheel with a spherical contour to enable it to provide increased load supporting surface.

A still further object of the invention is to provide a load supporting wheel for a self-propelled vehicle in which the load strains are substantially radial to the wheel and in which all surface points except the tire surface are equidistant from a common center.

A still further object of the invention is to provide a load supporting wheel having a spherical portion adapted to provide a maximum supporting area for the load carried by the wheel.

Another and still further object of the invention is to provide a compound wheel structure having a pneumatic tire normally capable of supporting the load and having an addition making the wheel spherical in shape to support the load in soft earth, which in addition is provided with means to increase wheel traction in soft earth.

Other and further objects of the invention will occur to those skilled in the arts to which this invention relates as the description proceeds which taken in connection with the accompanying drawing sets forth a preferred embodiment of the invention but such disclosures are not to be construed as a limitation of the invention which is limited only by the appended claims and any and all modifications, alterations and variations of structure coming within the spirit and scope thereof are deemed to be included herein.

In the drawing:

Fig. 1 shows a front elevational view of a wheel and axle assembly with one wheel in section to show detail.

Fig. 2 shows an end elevational view of one of the wheels.

Fig. 3 shows a sectional view of a modified wheel construction.

The emergence of portable excavating and hoisting equipment capable of high rates of travel over the ground has made traction elements of crawler type undesirable because of their inherently slow travel characteristics. The endless or crawler type traction elements have the very desirable characteristic of supporting the vehicle in fairly soft earth or even mud. When portable hoists have to move over the ground at faster speeds wheels must be used but when set on soft ground or run over it, these wheels will settle so deeply that traction is next to impossible or may be impossible altogether. The instant invention seeks to provide a wheel organization capable of supporting a vehicle such as a portable hoist or excavator, tractor, truck or similar device in the softest of earth and even mud and which will still enable the vehicle to traverse the ground at a high rate of travel exceeding that of the crawler type. The wheels forming the subject of the instant invention are used at both ends of the chassis and are especially useful in those vehicles where power is applied to all wheels although their utility is not limited thereto, and may be employed with equal facility on vehicles having only two traction wheels.

The above objects and advantages are achieved in a mechanism set forth in the several views of the drawings in which 1 is an axle of more or less conventional construction which is pivoted, in a horizontal plane, to a chassis 2 of the vehicle on which the vehicle body etc. is mounted.

Arranged on each end of the axle are skeins 3, only one of which is shown, on which bearings 4, 4, preferably of the anti-friction variety, are mounted. Rotatably mounted on the several bearings is a sleeve element 5, to the forward end of which a bearing cap 6 is removably secured.

At its opposite end the sleeve 5, from the cap 6, is expanded to form a brake drum 7 within which an appropriate brake element 8 is arranged and in order to prevent dirt, grit and other foreign matter entering, a guard mechanism is provided ahead of the brake to prevent the entrance of such dirt or grit.

The brake drum continues rearwardly for a distance until it expands into a segment of a sphere whose surfaces 10, 10 are drawn and formed about 11 as a center. 12, 12 are lugs or cleats formed on the outer surface of the segment of a sphere in order to increase the tractive effect of the wheel. This segment of a sphere continues to a point adjacent the tire 13 and then slopes downwardly toward the center of the wheel where it is formed into the rim or center 14 of the wheel. Disc 15 is interposed between the rim 14 and the sleeve 6. The structure thus far constitutes one part of the wheel. The tire 13 is of a conventional pneumatic type well known to the arts and is preferably set over the wheel or rim center 14 on an auxiliary rim 16, although this is not a strict necessity for all conditions of operation.

The outside or face of the wheel consists of another segment 18 in substantially the form of a hemisphere that originates in a center engageable with the rims 14 and 16 and also serves to hold the tire 13 thereon. The segment flares out to form a surface 17, 17 drawn about center 11 and to the same radius as the surfaces 10, 10. The segment 18 has lugs 19, 19 formed thereon to increase the tractive effect of the wheel.

The segment 18 is secured to the sleeve 6 and rim 14 by means of a plurality of bolts 20, 20 the heads of which are seated in sockets or recesses 21 and the other ends of the bolts are threaded into the flange 22 formed on rim 14.

The diameter of the tire 13 is a little greater than the maximum dimension of the spherical segments of the wheel. The reason for this is that when running over a hard surface the tire will support the entire load. When however, the wheel encounters soft earth or mud it will sink into the ground whereupon the spherical surfaces described will provide additional supporting and tractive surface. Because there will be a hydraulic effect of the wheel on the soft earth and especially in muddy earth, the forces against the sphere will be radial thereby providing a maximum supporting traction surface. These forces will be radial for the same reason that the forces acting on a ball submerged in water are radial. Where the ground is merely soft and not muddy the forces acting on the wheel will vary from radial to a small angle from the radial from one part of the wheel to the other on that part of the wheel pressed into the ground. It is thus evident that the wheels will provide a maximum tractive effect when traversing soft or muddy earth, this tractive effect being increased by use of the lugs or cleats 12 and 19.

The section view in Fig. 1 shows considerable space between the tire and the several segments. The object of this construction is to better enable the wheel to clear itself of mud, stones etc. when running over a hard surface roadway or in fact any kind of roadway.

Fig. 3 is a construction similar to that of Fig. 1 except that there is less clearance between tire and wheel segmental sections. This view shows a wheel without cleats or lugs such as shown in Fig. 1 and the construction provides a more nearly complete spherical form than is set forth in Fig. 1. Cleats and lugs similar to 12 and 19 may be provided as set forth above.

That which is regarded new, novel and useful and which is sought to be protected by Letters Patent of the United States is as follows:

1. In a wheel device; a center element having a rim support; a pneumatic tire and rim on said rim support, said tire normally supporting a load imposed thereon; and means to prevent said tire from sinking in soft earth or mud when traversing same which includes a segment of a sphere integrally secured to one side of said center element and a removable segment of a sphere secured to the other side of said center element, said removable segment of a sphere retaining said tire on said rim support, said tire and segments arranged to form a substantially spherical wheel in which the load when traversing soft terrain acts substantially radially of the submerged portion of the wheel to thereby increase the effective surface contact area.

2. In a wheel; a center element including a bearing sleeve and a pneumatic tire rim support; a disc connecting said sleeve and rim support; a pneumatic tire and rim supported on said rim support; a wall connecting said sleeve and rim support formed into the segment of a sphere over a portion of its surface; means to retain said tire on said rim support which includes a segment of a sphere having a radius equal to the radius of said first mentioned segment of a sphere; and said spherical segments and said tire forming a substantially spherical wheel in which the load when traversing soft terrain acts substantially radially of the submerged portion of said substantially spherical wheel thereby increasing the effective load supporting and traction area of said wheel.

3. In a wheel adapted to support a vehicle in soft earth; a center construction involving a bearing sleeve and a pneumatic tire rim support; a wall integrally associated with said rim support and sleeve formed over a portion of its exposed surface into the segment of a sphere; a pneumatic tire and rim on said rim support; a removable segment of a sphere securable to said rim support, locking said tire and rim in position, whose surfaces are drawn to the same radius and from the same center as said first mentioned segment; and said spherical segments and said tire forming a substantially spherical wheel in which the load when traversing soft terrain acts substantially radially of the submerged portion of said substantially spherical wheel thereby increasing the effective load supporting and traction area of said wheel.

4. In a wheel, the combination; a rim supported on a disc element; a tire supported on said rim; a segment of a sphere associated with one side of said rim; another segment of a sphere associated with the other side of said rim and adapted to hold said tire and said rim in position; and said segments flared from said tire to provide clearance between said segments to enable said wheel to clear itself of foreign matter; and said spherical segments and said tire forming a substantially spherical wheel in which the load when traversing soft terrain acts substantially radially of the submerged portion of said substantially spherical wheel thereby increasing the effective load supporting and traction area of said wheel.

5. In a wheel; a removable pneumatic tire to normally support the load imposed on the wheel; and segmental spherical elements arranged on both sides of said pneumatic tire to form a substantially spherical wheel in conjunction with said pneumatic tire; one of said segmental elements being removable and adapted to hold said tire in position; the load on said substantially spherical wheel when operating in soft terrain imposed substantially radially of said wheel to thereby increase the traction surface and load supporting area of the submerged portion of said wheel; said tire mounted on a portion of one of said segmental elements.

6. In a wheel; a center element; a pneumatic tire to normally support the imposed load removably mounted on said center element; a segment of a sphere integrally associated with said center element on one side thereof; a segment of a sphere removably secured to the other side of said center element; and said segments arranged adjacent said tire to form a substantially spherical wheel that will float in soft earth and wherein the load imposed on the wheel will act substantially radially thereof over the submerged surface and increase the tractive surface of the wheel.

7. In a wheel; a center element; a segment of a sphere integrally associated with one side of said center element; a pneumatic tire supported on said center element normally supporting the imposed load; a hemispheroidal segment removably secured to the other side of said center element constructed and arranged to hold said pneumatic tire in place; and said segments having their surfaces extending adjacent to said pneumatic tire to form a substantially spherical wheel in which the load imposed on said wheel acts radially thereof over the submerged portion of said wheel when traversing soft terrain to thereby increase the traction surface of said wheel.

8. In a traction wheel; a center element including a rim support; a pneumatic tire and its rim on said rim support, said tire normally supporting the imposed load; a sleeve; a wall connecting said rim support and said sleeve formed into a segment of a sphere over a portion of its surface; and a removable element securing said tire and rim on said rim support, said element formed into a segment of a sphere; said spherical elements extending adjacent to said tire to form a substantially spherical wheel in conjunction with said tire in which the load acts substantially radial over the portion of the wheel submerged in soft terrain to increase the traction surface thereof.

9. In a device as defined in claim 5 in which one of said spherical elements has a brake drum integrally formed therein.

10. In a device as defined in claim 6 in which the integral segment of a sphere has a brake drum formed therein.

11. In a device as defined in claim 7 in which the integrally associated segment of a sphere is constructed and arranged to provide a brake engaging surface.

12. In a device as defined in claim 8 in which said connecting wall is further formed so as to provide a brake drum for the wheel.

FRED L. WHITE.